Jan. 14, 1936.  C. J. ODEND'HAL  2,027,875
PRESSURE GAUGE
Filed Oct. 24, 1932
Fig. 1.
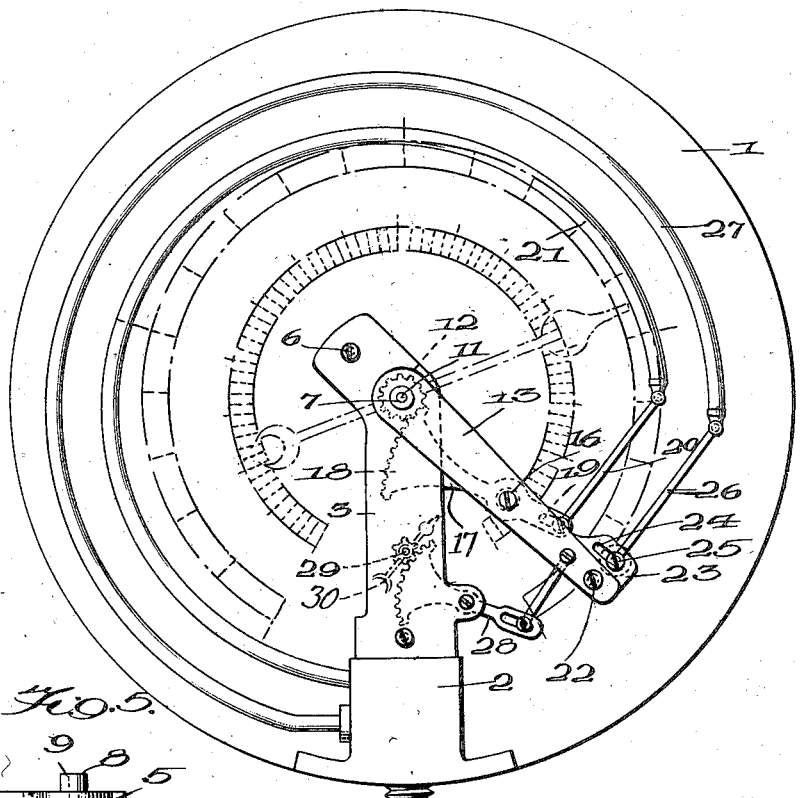
Fig. 5.
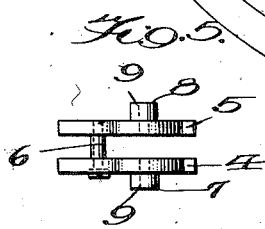
Fig. 2.
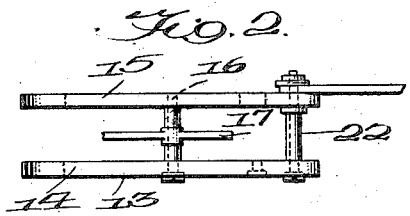
Fig. 4.
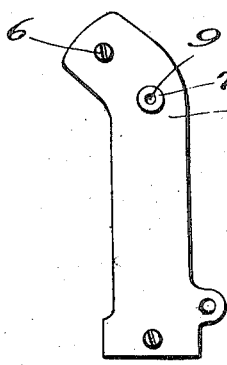
Fig. 3.
Inventor
Charles J. Odend'hal,
By Mason & Mason.
Attorney Patented Jan. 14, 1936

2,027,875

UNITED STATES PATENT OFFICE 2,027,875

PRESSURE GAUGE

Charles J. Odend'hal, Washington, D. C.

Application October 24, 1932, Serial No. 639,322

11 Claims. (Cl. 73—109)

The invention hereinafter described relates to a pressure gauge which is accurate under various conditions to which the gauge is subjected.

Pressure gauges, particularly of the Bourdon type, are intended to indicate the pressure of liquids or gases, or both, from a source or from a vessel. Such gauges, however, have been influenced by conditions such as atmospheric conditions which are unrelated to the condition of pressure of the source or vessel from which it is desired to obtain an indication of pressure. Moreover, heretofore the indicating hand of gauges of this type have been subject to vibration which prevents an accurate reading of the pressure to be ascertained.

An object of the invention is to provide an automatically compensated gauge which is unaffected by atmospheric changes of temperature or atmospheric pressure.

Another object of the invention is to provide a gauge the indicating needle of which is substantially vibrationless.

Another object of the invention is to provide an automatically compensated vacuum gauge which locates the position of the quadrant center to adjust for changes in temperature, barometric pressure, and for dampening out vibrations of the needle.

Another object of the invention is to provide a construction of this type which can be readily adjustable and which is permanent in its accuracy.

Still another object is the provision of a plurality of Bourdon tubes to operate a single indicator, all of the tubes being at their fixed ends connected to the same part.

Other objects and advantages will appear hereinafter through the specification. The present construction involves the use of a minimum number of parts, involving a small additional cost over the well known type of Bourdon tube, the structure being noted for its accurate and reliable operation under all conditions and changes of atmospheric pressure and temperature.

In the drawing:—

Figure 1 is an elevation of the gauge with the dial and indicating needle shown in dotted lines;

Figure 2 is a plan view of the main link showing the quadrant center broken away, and showing the attachment link for one of the tubes;

Figure 3 is a side elevation of the main link;

Figure 4 is a side elevation of the upright which supports the links and the shaft with the indicating needle, and Figure 5 is a plan view of the upright disclosed by Figure 4.

Referring particularly to Fig. 1, the numeral 1 indicates the casing used for protecting the gauge movement and for supporting the various parts. 2 is the nipple which is adapted to be connected to a source of pressure, while 3 is an upright fixed to the upper part of said nipple. The upright consists of a pair of arms 4 and 5 which are held in proper spaced relation by a bolt 6. Each of the arms 4 and 5 has a boss 7 and 8, the bosses being provided with bearings 9 which extend through the arms. The bearings support the shaft 11 to which the indicating needle is affixed. Mounted upon the shaft 11 is a gear 12, the gear being splined to the shaft, or otherwise attached so as to turn the shaft when the gear is operated. The bosses 7 and 8 form supports for the arms 14 and 15 of the main link 13, which swing freely thereon. Mounted substantially midway of the arms 14 and 15 is a shaft 16 which carries the quadrant arm 17. The quadrant arm is movable about the pivot 16 and is provided at one end with a gear segment 18 meshing with the gear 12. The opposite end of the quadrant arm is provided with a slot 19 in which one end of the link 20 is adjustably mounted. The opposite end of the link is pivotally connected with the tube 21. The tube 21 has its opposite end connected to the nipple 2, which end is open and in free communication with the interior of the nipple.

The ends of the arms 14 and 15 which are opposite from the ends to which the arms are pivoted, are connected by a pin 22 so that both arms move as one about the pivot formed by the bosses 7 and 8. Preferably, one of the arms adjacent the end having the pin 22 is provided with an ear 23 having a slot 24. Located in the slot is an adjustable connecting member 25 which adjustably connects one end of the link 26 to said arm. The opposite end of the link 26 is pivotally connected to a second tube 27, the other end of which is mounted on the nipple 2.

Opposite ends of the tube 27 are sealed, preferably after the tube has been subjected to a vacuum. The tube 27 may be filled with any suitable gas. The tube 21, as stated heretofore, has the end which is connected to the nipple 2 in communication with the interior of the nipple. The opposite end of tube 21 as will be apparent, where it connects with the link 20, is closed.

The operation is as follows:—

Variation of vacuum or pressure from the source which is connected to the nipple 2, that is connected to or in communication with the interior of tube 21, changes the position of the free end of the tube 21, which tube being connected to linkage so operates the quadrant 17 about its pivot 16, thus causing the gear segment 18 and gear 12 to rotate the shaft 11 and to move the indicating needle, this being splined or otherwise connected to gear 12. Any variation in pressure surrounding the tube 21 due to atmospheric changes, would tend to cause similar movement of the registering hand, although to a lesser extent. The tube 27 is subjected to a constant pressure within the tube, said tube being closed at both ends and only the pressure surrounding the tube will effect its movement. Changes in atmospheric pressure or temperature will, therefore, cause both tubes to move in the same direction. Considering surrounding atmospheric pressure only, if the tube 21 should move from this cause it would tend to move the quadrant about its center, the tube 27 also having a similar movement and will move the link 13 about its pivotal support 7, 8, thereby changing the center of the quadrant.

The numeral 28 indicates an arm having a link connection to the main link 13 and having a gear segment on its other end connected to a gear 29 having a pointer 30. This attachment which is actuated by movement of the main link, acts as a barometer attachment to the gauge and indicates any error due to faulty operation of the tube 27. One or both of the links 20 and 26 can be adjusted in the slots to which they are connected to adjust the operation of the gauge. The attachment is a barometer and allows an additional reading to be obtained from the same instrument of barometric conditions. While the arm 28 and gear 29 are affected by temperature as well as pressure, it will be appreciated that the purpose of these parts is to indicate by means of a pointer attached to gear 29, barometric changes.

From the above it will be seen that if the end of the tube 21 which is connected to the link 20 moves to the right, due to atmospheric changes of pressure or temperature, the free end of tube 27 will likewise move to the right, moving the main link 13 in a counterclockwise direction and carrying the center of the quadrant also in a clockwise direction about the gear center with no consequent movement of the registering needle. The links 20 and 26 may be so adjusted in their slots 19 and 24, respectively, that no movement of the registering needle will take place with changes in atmospheric pressure or temperature. Because of the mounting of the several links and quadrant arm, dampening of vibrations is successfully accomplished as the tube 27 acts as a spring to dampen the vibrations due to sudden changes of pressure within the tube 21, or for other causes which would make the indicating needle vibrate. The connection of the tube 27 with the main link is such that all vibrations are absorbed and thus dampened out.

It is understood that the description and drawing herein are for illustrative purposes, these being merely only one embodiment of my invention. I desire to comprehend within the scope of my invention all forms limited only by the appended claims.

What I claim is:—

1. A differential pressure gauge consisting of a support having a hollow interior, a pair of tubes attached to said support, one of said tubes having an interior connection with the interior of said support, the other tube being sealed at both ends, and means connected to the ends of said tubes including a link and a quadrant arm mounted thereon and movable relatively thereto, a hand actuated by said quadrant arm, one tube being connected to said link and the other to said arm for preventing movement of the registering hand due to changes of atmospheric pressure.

2. A pressure gauge consisting of a pair of tubes, a fluid charging connection to one of said tubes, a link connected to said tube, a quadrant connected to said link, a gear meshing with the end of said quadrant, an indicating needle actuatable by said gear, said other tube having a sealed interior, and means mounting said quadrant and connected to said other tube acting to automatically adjust the position of said quadrant to compensate for movement of said first named tube caused by changes in the temperature surrounding the same.

3. A pressure gauge comprising a casing, a nipple located within said casing and connected to a source of pressure, a plurality of tubes, one of said tubes having its interior in communication with the interior of said nipple, the other tube being sealed at both ends, said first named tube having a connection to a quadrant, a pinion gear having a fixed mounting meshing with said quadrant for actuating an indicating needle, and means connected with said other tube, and having a pivot support for said quadrant for automatically adjusting the position of said quadrant with relation to said pinion gear, the end of said other tube having a direct connection with one end of said means.

4. A differential pressure gauge consisting of a plurality of tubes, a fluid charging connection for one of said tubes, a quadrant connected to the other end of said tube at one of the quadrant's ends and connected at its other end to an indicating needle, said needle having a fixed support, the other tube having a vacuumized interior, and means having a pivotal mounting for said quadrant and connected to the last named tube for dampening out vibration of the indicating needle.

5. A gauge consisting of a pair of tubes, a fluid charging connection connected to the interior of one of said tubes, a main link, said other tube having a vacuumized interior and having one of its ends connected to said link, a pivotal mounting for said main link, a support for said pivotal mounting, a quadrant, said first named tube having a connection to said quadrant, means pivotally mounting said quadrant in said main link, whereby the center of the quadrant is adjusted automatically for changes of atmospheric pressure.

6. A gauge consisting of a pair of tubes, a fluid charging connection connected to the interior of one of said tubes, a main link, said other tube having one of its ends connected to said main link and said other tube having a sealed interior, a pivotal mounting for said main link, a support for said pivotal mounting, a quadrant, said first named tube having a connection to said quadrant, means pivotally mounting said quadrant in said main link, whereby the center of the quadrant is adjusted automatically for changes of atmospheric pressure.

7. A differential pressure gauge consisting of a pair of tubes, fluid charging connection mounting said tubes, the interior of one of said tubes being connected to the interior of said fluid charging connection, the other tube being sealed at both ends, a support mounted on said fluid charging connection, a bearing mounted in said support, a shaft mounted in said bearing adapted to mount an indicating needle, a gear supported on said shaft, a connecting link, and a quadrant one end of which meshes with said gear, said link having one of its ends connected to said quadrant and its other end connected to one of said tubes, a main link connected to the end of said other tube, said main link having a pivotal support for said quadrant whereby when said last named tube is influenced by atmospheric pressure the pivotal connection of said connecting link will be moved.

8. A pressure gauge consisting of a tube, a fluid charging connection to the interior of said tube, a support, a second tube, said second tube having a sealed interior, bosses on said support, a main link pivotally mounted on said bosses, and a connection from said link to the second tube, a quadrant pivotally supported in said main link, an indicating needle and means for driving said needle from said quadrant, means for connecting one end of said quadrant to said first named tube whereby said second named tube acts to dampen vibrations of the indicating needle and to prevent operation of the needle from changes of temperature and pressure acting upon the exterior of said tube first named.

9. A pressure gauge consisting of a tube, a fluid charging connection to the interior of said tube, a support, a second tube having a vacuumized interior, bosses on said support, a main link pivotally mounted on said bosses, and a connection from said link to the second tube, an indicating needle, a quadrant pivotally supported in said main link having one of its ends connected to drive said indicating needle and its other end connected to said first named tube whereby said second named tube acts to dampen vibrations of the indicating needle and to prevent operation of the needle from changes of temperature and pressure acting upon the exterior of said tube first named.

10. A gauge consisting of a pair of tubes, a fluid charging connection connected to the interior of one of said tubes, a main link, a pivotal mounting for said main link, a support for said pivotal mounting, a quadrant, said first named tube having a connection to said quadrant, means pivotally mounting said quadrant in said main link, whereby the center of the quadrant is adjusted automatically for changes of atmospheric pressure, said other tube having its interior sealed whereby it responds to barometric pressure only and means connecting said other tube to said main link and a member connected to said main link adapted to indicate barometric conditions only.

11. A pressure gauge comprising a casing, a member located in said casing and connected to a source of pressure, a tube connected to said member adapted to be influenced by pressure changes, an indicator mounted to turn upon a stationary pivot, means connecting said tube with said indicator, and means influenced by atmospheric conditions only including a pivoted arm having a support for said connecting means whereby to prevent actuation of the indicator only, upon changes of pressure within said member.

CHARLES J. ODEND'HAL.